United States Patent
Deferme

(12) 
(10) Patent No.: US 6,220,409 B1
(45) Date of Patent: Apr. 24, 2001

(54) STROKE DEPENDENT BYPASS

(75) Inventor: Stefan Deferme, Heusden-Zolder (BE)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/306,343

(22) Filed: May 6, 1999

(51) Int. Cl.[7] ...................................................... F16F 9/34
(52) U.S. Cl. ............................. 188/322.15; 188/282.6; 188/282.1; 188/283; 188/322.16
(58) Field of Search ............................... 188/282.6, 281, 188/282.1, 282.5, 283, 283.1, 322.15, 322.13, 322.14, 322.16

(56) References Cited

U.S. PATENT DOCUMENTS

| | | |
|---|---|---|
| 3,180,453 | 4/1965 | Murata . |
| 3,232,390 | 2/1966 | Chano . |
| 3,379,286 | 4/1968 | Takagi . |
| 3,570,635 * | 3/1971 | Takagi .............................. 188/322.15 |
| 4,765,446 * | 8/1988 | Murate et al. ..................... 188/282.4 |
| 4,874,066 * | 10/1989 | Silberstein .......................... 188/280 |
| 4,953,671 | 9/1990 | Imaizumi . |
| 5,058,715 * | 10/1991 | Silberstein .......................... 188/280 |
| 5,248,014 * | 9/1993 | Ashiba .............................. 188/282.8 |
| 5,505,225 | 4/1996 | Niakan . |

* cited by examiner

*Primary Examiner*—Robert J. Oberleitner
*Assistant Examiner*—Devon Kramer
(74) *Attorney, Agent, or Firm*—Harness, Dickey & Pierce, PLC

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a compression and a rebound valve assembly. The piston assembly also includes a housing attached to the piston rod within which is slidably disposed a piston to define a closed chamber. The closed chamber is in communication with one of the working chambers through a passageway extending through the piston rod. The housing and piston provide two stage damping in rebound and compression with a smooth transition between soft and firm damping.

12 Claims, 3 Drawing Sheets

STROKE DEPENDENT BYPASS

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping is provided for small amplitudes of movement and a relatively high level of damping is provided for large amplitudes of movement.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these small or fine vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a fluid cylinder and piston assembly located on the end of the piston rod in the lower working chamber. The interior of the fluid cylinder is in communication with the hydraulic fluid in the upper working chamber. When the shock absorber undergoes a small stroke, the fluid flows through two separate flow paths to provide a soft damping. When the shock absorber undergoes a large stroke, fluid flow in one of two paths progressively reduces to provide a firm damping.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
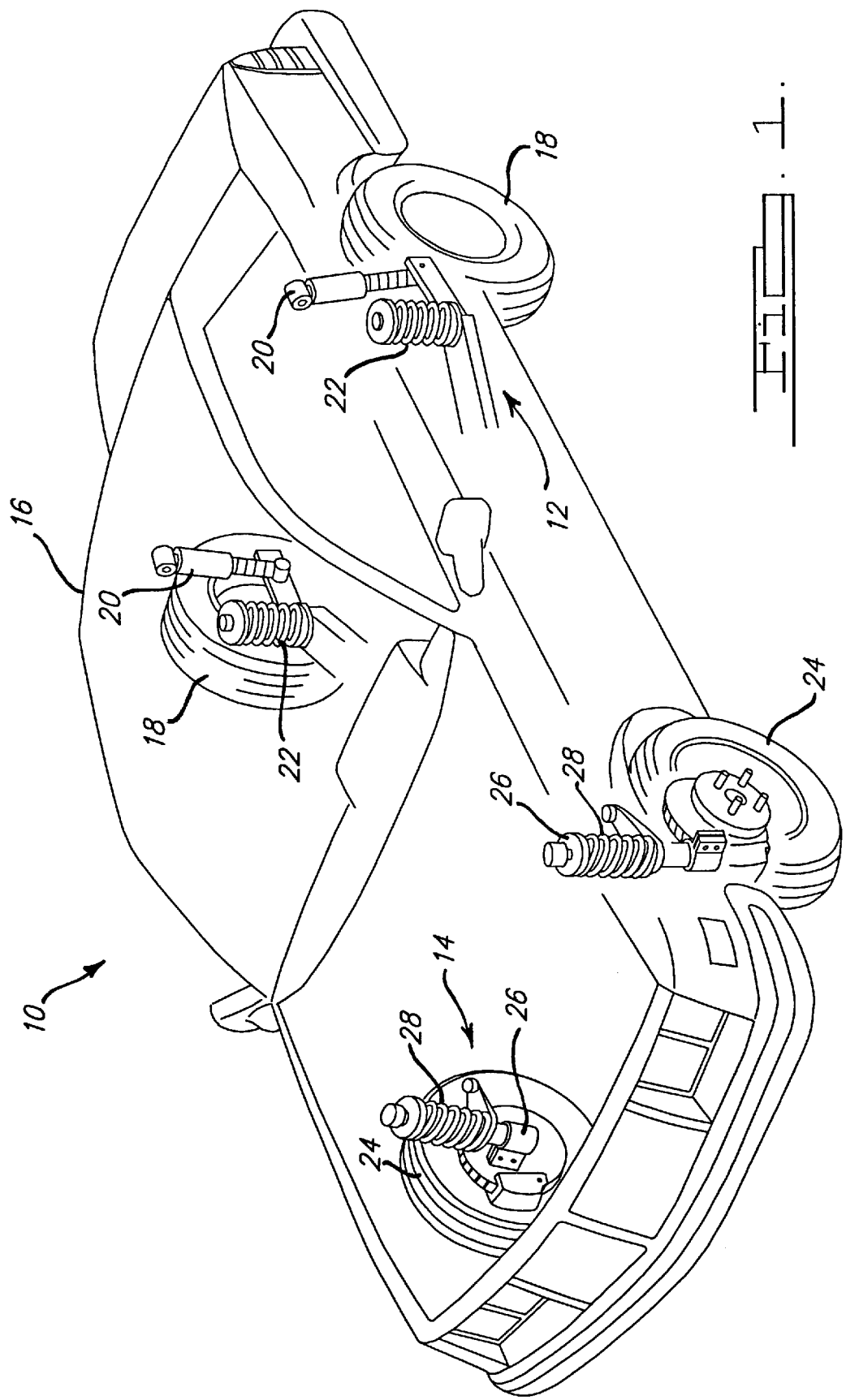
FIG. 1 is an illustration of an automobile using shock absorbers incorporating the multi-force damping force generating device in accordance with the present invention.

Referring now to the drawings in which like reference numerals designate like or corresponding parts throughout the several views, there is shown in FIG. 1 a vehicle incorporating a suspension system having the multi-force damping shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
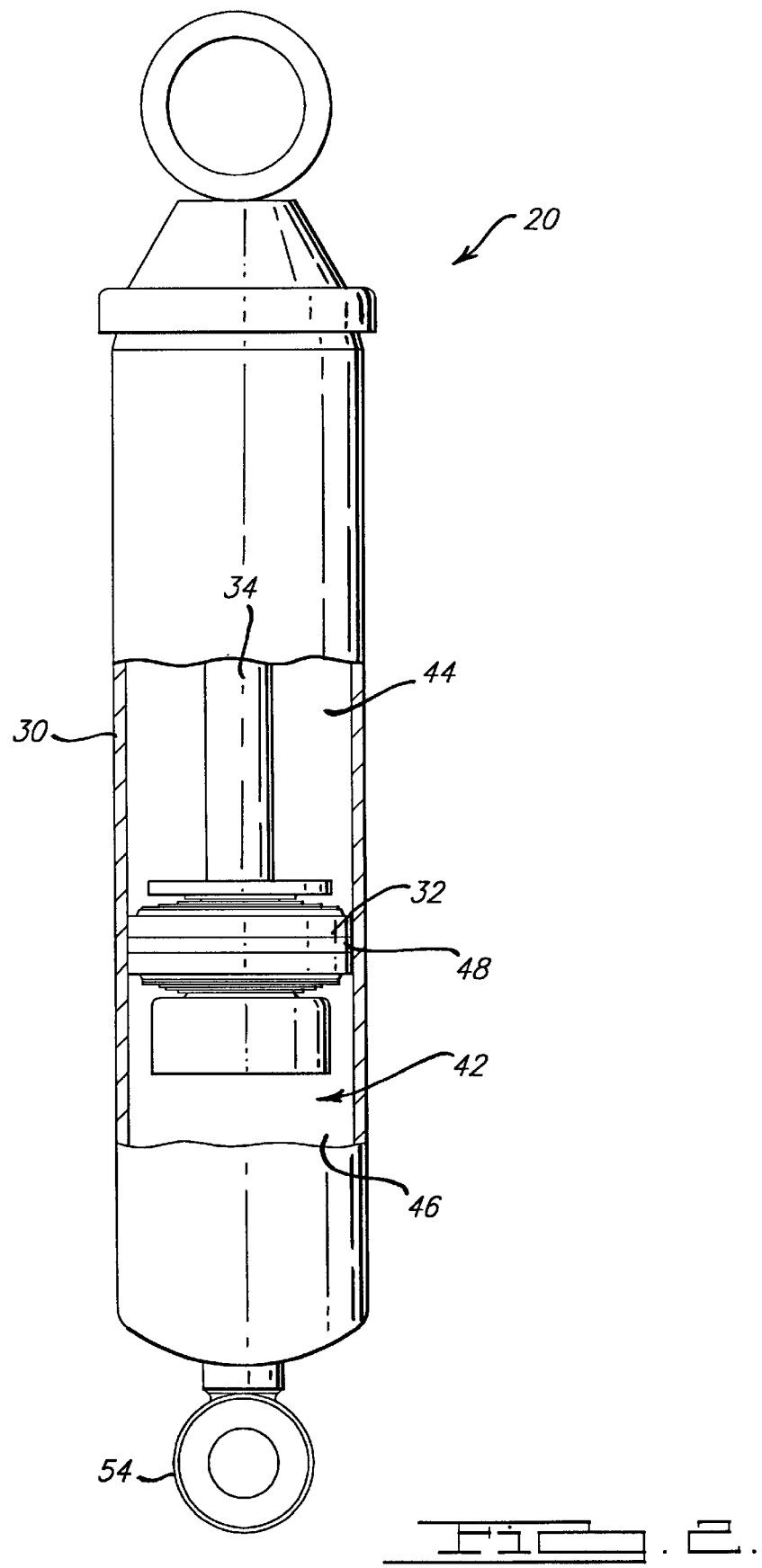
FIG. 2 is a cross-sectional side view of a monotube shock absorber incorporating the multi-force damping force generating device in accordance with the present invention.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the other of the sprung or unsprung masses of the vehicle. In the preferred embodiment fitting 54 is secured to the unsprung mass of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
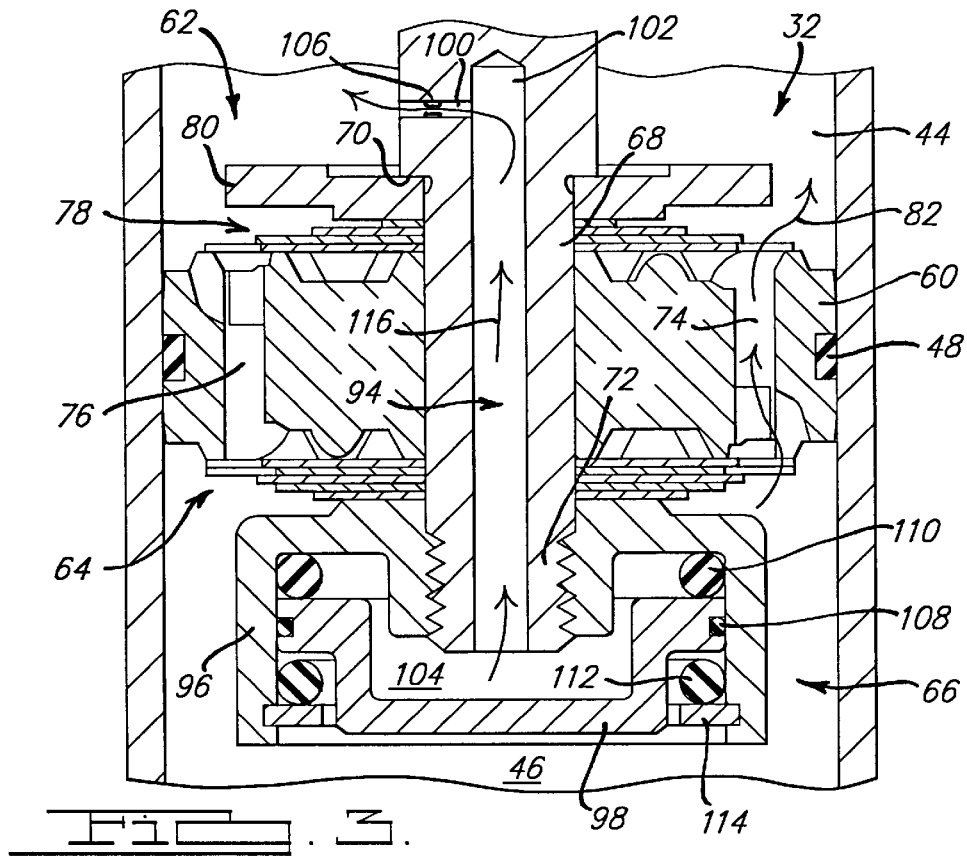
FIG. 3 is an enlarged cross-sectional side view illustrating the piston assembly of the shock absorber shown in FIG. 1 during a compression stroke of the shock absorber.
Figure 4:
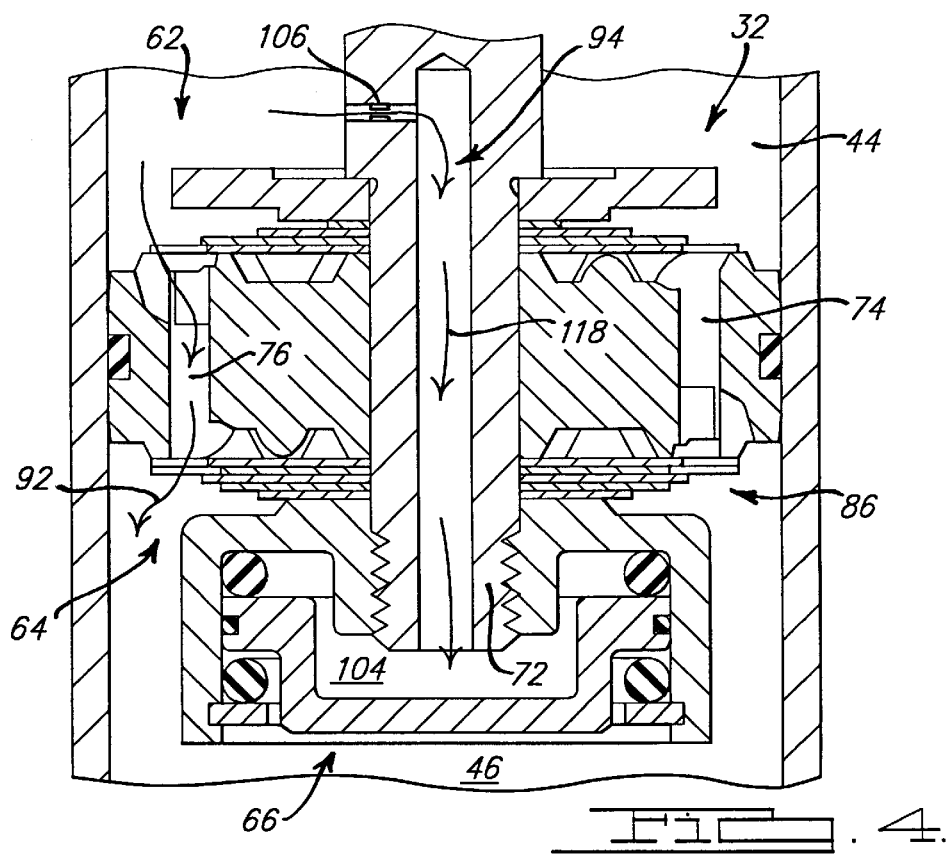
FIG. 4 is an enlarged cross-sectional side view illustrating the piston assembly of the shock absorber shown in FIG. 1 during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a sliding piston assembly 66. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70 and with rebound valve assembly 64 being located between piston body 60 and a threaded end 72 of piston rod 34. Piston body 60 defines a plurality of compression flow passages 74 and a plurality of rebound flow passages 76.

Compression valve assembly 62 comprises a plurality of compression valve plates 78 and a valve stop 80. Valve plates 78 are disposed adjacent to piston body 60 to cover the plurality of compression flow passages 74. Valve stop 80 is disposed between valve plates 78 and shoulder 70 to limit the deflection of valve plates 78. During a compression stroke of shock absorber 20, fluid pressure builds up in lower working chamber 46 until the fluid pressure applied to valve plates 78 through passages 74 overcomes the load required to deflect valve plates 78. Valve plates 78 elastically deflect opening passages 74 to allow fluid to flow from lower working chamber 46 to upper working chamber 44 as shown by arrows 82 in FIG. 3.

Rebound valve assembly 64 comprises a plurality of valve plates 86. Valve plates 86 are disposed adjacent to piston body 60 to cover the plurality of rebound flow passages 76. Sliding piston assembly 66 is threaded onto end 72 of piston rod 34 to retain valve plates 86 against piston body 60 to close passages 76. During an extension stroke of shock absorber 20, fluid pressure builds up in upper working chamber 44 until the fluid pressure applied to valve plates 86 through passages 76 overcomes the load required to deflect valve plates 86. Valve plates 86 elastically deflect opening passages 76 to allow fluid to flow from upper working chamber 44 to lower working chamber 46 as shown by arrows 92 in FIG. 4.

Sliding piston assembly 66 comprises a flow passage 94, a housing 96 and a sliding piston 98. Flow passage 94 extends through piston rod 34 and includes a radial passage 100 and an axial passage 102 which opens into a chamber 104 defined by housing 96 and piston 98. Radial passage 100 includes a restriction 106 which controls the amount of fluid flow through flow passage 94. Housing 96 is a cup shaded housing threadingly received onto end 72 of piston rod 34. Housing 96 clamps valve plates 86 against piston body 60 and also acts as a stop to limit the deflection of valve plates 86. Sliding piston 98 is slidingly received within housing 96 to define chamber 104. A seal 108 is disposed between piston 98 and housing 96 to permit sliding movement of piston 98 with respect to housing 96 without generating undue frictional forces as well as sealing chamber 104 from lower working chamber 46. A first rubber ring 110 is disposed between piston 98 and housing 96. A second rubber ring 112 is disposed between piston 98 and a retaining ring 114. Retaining ring 114 maintains the assembly of piston assembly 66 while providing a reaction point for rubber ring 112. Rubber rings 110 and 112 limit the movement of piston 98 and provide for the smooth transition between soft and firm damping as will be described later herein.

Referring now to FIG. 3, during a compression stroke, fluid in lower working chamber 46 is compressed and fluid flows between lower working chamber 46 and upper working chamber 44 through passages 74 overcoming the load required to deflect valve plates 78 opening passages 74 (arrows 82). Fluid pressure within lower working chamber 46 also reacts against the bottom of piston 98,compressing fluid within chamber 104 causing fluid from chamber 104 through flow passage 94 to upper working chamber 44 (arrows 116). The amount of fluid flow will be determined by the amount of pressure built up within lower working chamber 46 and chamber 104, the amount of free movement of piston 98 between rings 110 and 112 and the spring rate created by the compression of ring 110. Thus, for small movements, there will be two flow paths as shown by arrows 82 and 116. As the amount or rate of compression stroke increases, the fluid flow through passage 94 (arrows 116) will gradually decrease to provide a smooth transition from an initially soft damping to a firm damping condition for shock absorber 20. The compression of ring 110 will provide the smooth transition.

Referring now to FIG. 4, during a rebound stroke, fluid in upper working chamber 44 is compressed and fluid flows between upper working chamber 44 and lower/working chamber 46 through passages 76 overcoming the load required to deflect valve plates 86 opening passages 76 (arrows 92). Fluid pressure within upper working chamber 44 also flows through passage 94 and into chamber 104 to react against the upper surface of piston 98 compressing fluid within chamber 104 (arrows 118). The amount of fluid flow with be determined by the amount of pressure built up within upper working chamber 44 and chamber 104, the amount of free movement of piston 98 between rings 110 and 112 and the spring rate created by the compression of ring 112. Thus, for small movements, there will be two flow paths as shown by arrows 92 and 118. As the amount or rate of extension increases, the fluid flow through passage 94 (arrows 118) will gradually decrease to provide a smooth transition from an initially soft damping to a firm damping condition for shock absorber 20. The compression of ring 112 will provide the smooth transition.

Thus, shock absorber 20 provides a soft damping or comfort setting for small strokes and a firm (safety) setting for larger strokes. The multi-force damping characteristics work both in compression and in rebound or extension. In addition the multi-force damping is not position dependent and it provides a smooth transition between soft and firm damping avoiding unwanted switching noise. While the invention has been illustrated incorporated into a monotube shock absorber, it is within the scope of the present invention to incorporate piston assembly 66 into a double tube design if desired.

While the above detailed description describes the preferred embodiment of the present invention, it should be understood that the present invention is susceptible to modification, variation and alteration without deviating from the scope and fair meaning of the subjoined claims.

What is claimed is:

1. A two-stage shock absorber comprising:

a pressure tube defining a chamber;

a piston member slidably disposed within said pressure tube, said piston member dividing said chamber into an upper working chamber and a lower working chamber;

a piston rod extending through one of said working chambers and projecting out of said pressure tube, said piston rod being attached to said piston member;

a valve assembly attached to said piston member, said valve assembly providing a first and a second fluid passageway through said piston member;

a continuously open third fluid passageway defined through said piston rod, said third fluid passageway extending between said one of said working chambers and a pressure chamber defined by said piston member, said third fluid passage being the only fluid communication path between said one of said working chambers and said pressure chamber said pressure chamber being defined by a housing attached to said piston rod and a piston slidably disposed within said housing;

a retaining ring attached to said housing for retaining said piston within said housing; and a first flexible member disposed between said piston and said retaining ring.

2. The two stage shock absorber according to claim 1 wherein said valve assembly includes a compression valve assembly and a rebound valve assembly.

3. The two stage shock absorber according to claim 1 further comprising a second flexible member disposed between said piston and said housing.

4. The two stage shock absorber according to claim 1 wherein said housing is threadingly received on said piston rod.

5. A two stage shock absorber comprising:

a pressure tube defining a working chamber;

a piston assembly slidably disposed within said pressure tube, said piston assembly dividing said working chamber into an upper working chamber and a lower working chamber;

a piston rod extending through one of said working chambers and projecting out of said pressure tube, said piston rod being attached to said piston assembly;

a first valve attached to said piston assembly, said first valve providing a first fluid passageway through said piston assembly;

a second valve attached to said piston assembly, said second valve providing a second fluid passage through said piston assembly;

a housing attached to said piston rod, said housing being adjacent to but separate from said piston assembly;

a piston disposed within said housing, said piston and said housing defining a pressure chamber;

a third fluid passageway extending between said one of said working chambers and said pressure chamber;

a retaining ring attached to said housing for retaining said piston within said housing; and a first flexible member disposed between said piston and said retaining ring.

6. The two stage shock absorber according to claim 5 said housing is threadingly attached to said piston rod.

7. The two stage shock absorber according to claim 5 further comprising a flexible member disposed between said piston and said housing.

8. The two stage shock absorber according to claim 5 further comprising a second flexible member disposed between said piston and said housing.

9. A two-stage shock absorber comprising:

a pressure tube defining a working chamber;

a piston assembly slidably disposed within said pressure tube, said piston assembly dividing said working chamber into an upper working chamber and a lower working chamber;

a piston rod extending through one of said working chambers and projecting out of said pressure tube, said piston assembly being attached to said piston rod;

a housing attached to said piston rod, said housing being adjacent to but separate from said piston assembly;

a piston disposed within said housing, said piston and said housing defining a pressure chamber;

a fluid passageway extending between said one of said working chambers and said pressure chamber;

a retaining ring attached to said housing for retaining said piston within said housing; and a first flexible member disposed between said piston and said retaining ring.

10. The two-stage shock absorber according to claim 9, wherein said piston assembly includes a compression valve assembly and a rebound valve assembly, said compression valve assembly and said rebound valve assembly being separate from said piston in said housing.

11. The two-stage shock absorber according to claim 9, wherein said piston assembly is slidably disposed on said piston rod and said housing is threadingly attached to said piston rod.

12. The two-stage shock absorber according to claim 9, wherein said housing secures said piston assembly to said piston rod.

* * * * *

UNITED STATES PATENT AND TRADEMARK OFFICE
CERTIFICATE OF CORRECTION

PATENT NO. : 6,220,409 B1 Page 1 of 1
DATED : April 24, 2001
INVENTOR(S) : Stefan Deferme It is certified that error appears in the above-identified patent and that said Letters Patent is hereby corrected as shown below:

Column 4,
Line 44, "lower/working" should be -- lower working --
Line 51, "with" should be -- will --

Signed and Sealed this

Sixteenth Day of July, 2002

Attest:

Attesting Officer

JAMES E. ROGAN
Director of the United States Patent and Trademark Office